United States Patent

[11] 3,590,274

[72] Inventor Robert R. Marley
San Jose, Calif.
[21] Appl. No. 841,765
[22] Filed July 15, 1969
[45] Patented June 29, 1971
[73] Assignee Fairchild Camera and Instrument Corporation
Syosset, Long Island, N.Y.

[54] TEMPERATURE COMPENSATED CURRENT-MODE LOGIC CIRCUIT
20 Claims, 5 Drawing Figs.

[52] U.S. Cl. .......... 307/215, 307/218, 307/297, 307/310
[51] Int. Cl. .......... H03k 19/30, H03k 19/34
[50] Field of Search .......... 307/215, 218, 297, 310

[56] References Cited
UNITED STATES PATENTS

| | | | |
|---|---|---|---|
| 3,328,603 | 6/1967 | Dunn et al. | 307/218 X |
| 3,440,449 | 4/1969 | Priel et al. | 307/291 |
| 3,523,194 | 8/1970 | Sheng | 307/218 X |

*Primary Examiner*—Donald D. Forrer
*Assistant Examiner*—John Zazworsky
*Attorneys*—Roger S. Borovoy and Alan H. MacPherson

ABSTRACT: A logic circuit for providing both high and low output logic levels which are substantially temperature independent, and which has a stable reference source, including a pair of parallel-connected input transistors; a bias supply; a pair of output circuits for deriving each of the two possible output signal levels; a stabilizing circuit including a resistor in series with a pair of parallel back-to-back PN junctions; and a stable source of reference voltage.

INVENTOR.
ROBERT R. MARLEY
BY [signature]
ATTORNEYS

INVENTOR
ROBERT R. MARLEY
BY
ATTORNEYS

TEMPERATURE COMPENSATED CURRENT-MODE LOGIC CIRCUIT

FIELD OF THE INVENTION

The field of this invention is logic circuitry, particularly of the kind now found in silicon semiconductor integrated circuits. The particular type of circuitry of this invention is normally termed "emitter-coupled logic" or, alternatively, "current-mode logic."

PRIOR ART

A conventional current-mode logic circuit is shown in FIG. 1. Note how the emitters of the two input transistors 1 and 2 and the reference transistor 3 are coupled–hence the term "emitter-coupled logic."

The circuit of FIG. 1 operates as follows: Transistor 4 and 5, which serve as voltage translators, are biased "on" by voltage supplies $V_{CC}$ and $V_{EE}$. In conventional emitter-coupled logic, $V_{EE}$ is always the lowest voltage in this circuit and $V_{CC}$ is always the highest voltage in the circuit. Normally, $V_{CC}$ is ground, as illustrated.

If either or both of the input signals to input transistors 1 and 2 are high, the transistor or transistors receiving the high input signal are turned on and transistor 3 is thereby turned off. In that event, the OR output signal from transistor 5 is high, indicating at least one of the two input signals was high, and the NOR output signal from transistor 4 is low (since the output of transistors 4 and 5 are always opposite to each other in this type of logic circuit). If both inputs to transistors 1 and 2 are low, both transistors are turned off and transistor 3 is thereby turned on. In that case, the output from transistor 5 is low and the output from transistor 4 is high, indicating the NOR condition, that is the lack of a high input level at either transistors 1 or 2.

Another embodiment of the circuit, also emitter coupled and normally called an emitter follower current switch, is shown in FIG. 2. The only difference between the more conventional circuit shown in FIG. 1 and the embodiment of FIG. 2 is that the position of the emitter follower voltage translator in the output circuit is changed. The operation of the conventional circuit of FIG. 2, which operates in substantially the same manner as the circuit of FIG. 1, will be readily apparent to the skilled practitioner from the above description of the operation of the circuit of FIG. 1.

In neither of the conventional circuits of FIG. 1 or FIG. 2 is any attempt made at temperature compensation. Although emitter-coupled circuits have been constructed with temperature compensation, the results have not been entirely satisfactory. For example, one type of circuit uses an additional transistor in parallel with the reference transistor to achieve such compensation. However, while there is temperature compensation in either the high or low output conditions, the compensation is not effective in both conditions. Obviously, it is desirable to have an emitter-coupled logic circuit which is temperature compensated irrespective of the extant output conditions.

SUMMARY OF THE INVENTION

The circuit of the subject invention is designed to obtain a stable output level in either the high or low condition which is substantially independent of temperature over a reasonable range. Moreover, the invention provides a reference voltage source which is very stable over reasonable temperature ranges.

Briefly, the logic circuit of the subject invention for providing both high and low output logic levels which are substantially temperature independent comprises: a pair of parallel-connected input transistors having coupled emitters and coupled collectors; a biasing means for connecting a power supply across the input transistors; a pair of output circuits for deriving two output signals from the collectors of the input transistors, one output signal being of one level while the other is of a different level, the difference between levels being readily detectable; and a stabilizing circuit coupled between the pair of output circuits, including a resistor in series with a pair of parallel back-to-back PN junctions, the stabilizing means maintaining the two different output levels from each of the output circuits substantially constant over reasonable changes in ambient temperature.

The stable reference source of the invention includes a third transistor having its emitter coupled to the emitters of the pair of input transistors, the third transistor and the input transistors together forming a current switch; a current source series-coupling the coupled emitters of the input transistors and one power supply terminal, including a fourth transistor having its emitter-collector circuit coupled between the coupled emitters of the input transistors and the one power supply terminal; a fifth transistor having its emitter-collector circuit coupled between the other power supply terminal and the base of the third transistor; a sixth transistor having its emitter-collector circuit coupled between the respective bases of the third and fourth transistors; a first resistor coupling the base of the fifth transistor to the other power supply terminal; one or more series-connected diodes coupling the respective bases of the fifth and sixth transistors; second and third diodes and a second resistor all connected in series between the one power supply terminal and the base of the sixth transistor; and a third resistor coupling the emitter of the sixth transistor through a diode to the one power supply terminal.

DETAILED DESCRIPTION

Figure 1:
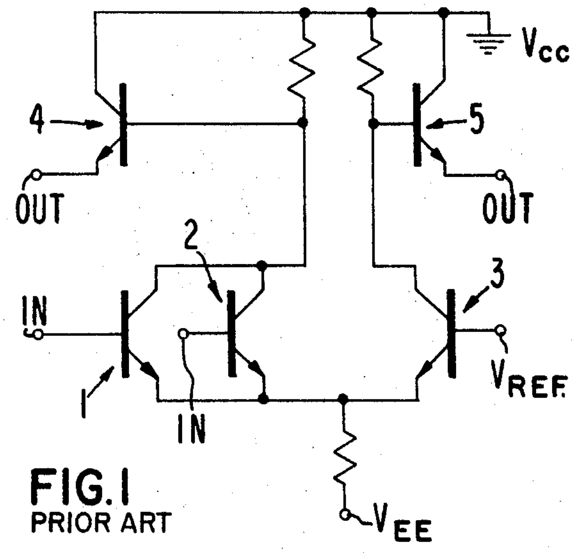
FIG.1 PRIOR ART
FIG. 1 of the drawings is a conventional emitter-coupled logic circuit.
Figure 2:
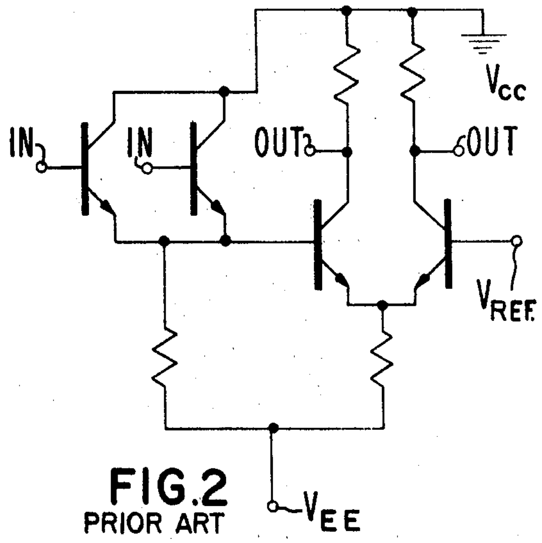
FIG.2 PRIOR ART
FIG. 2 is an alternative embodiment of a conventional emitter-coupled circuit; voltage
Figure 3:
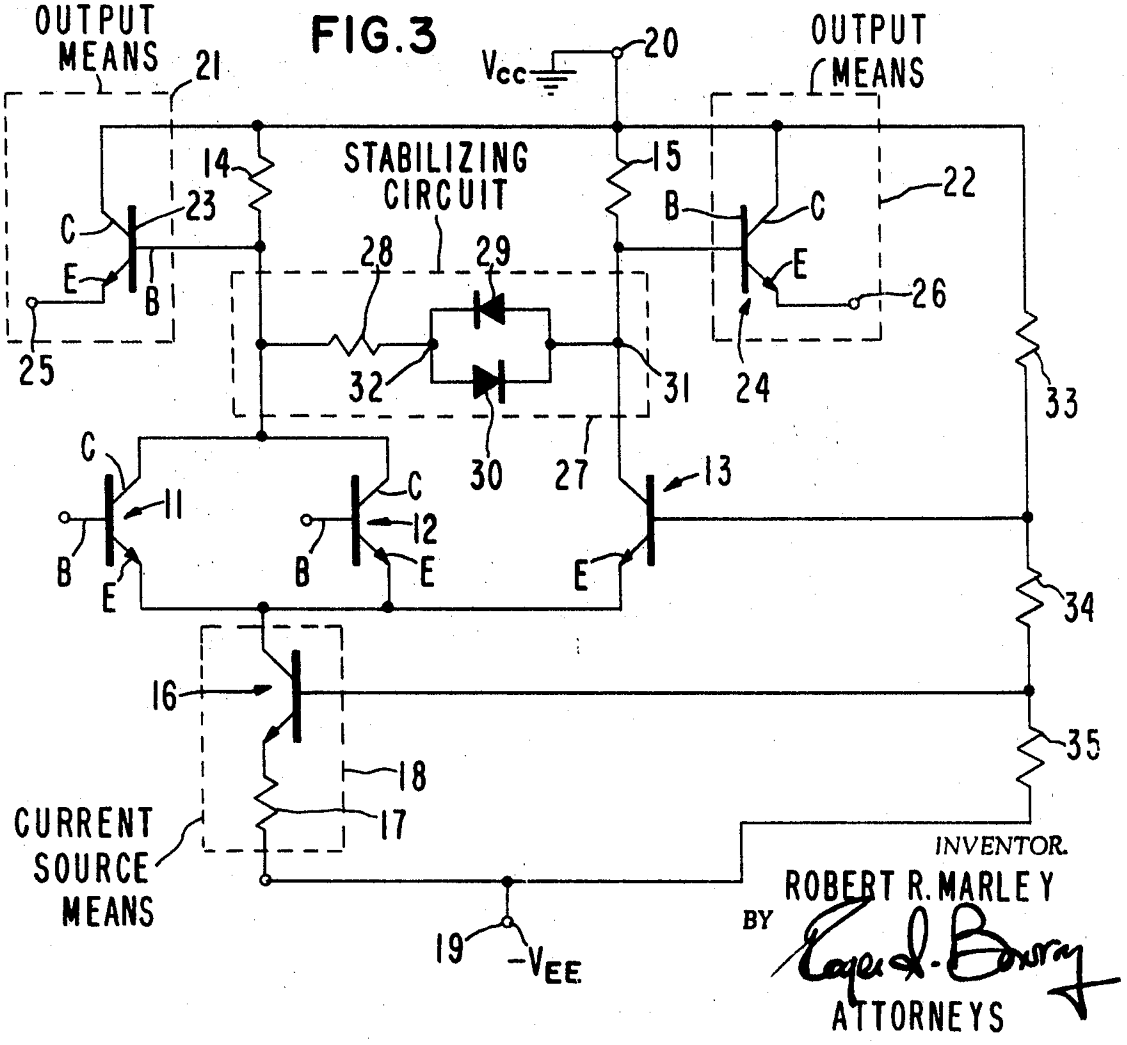
FIG. 3 is the circuit of a preferred embodiment of this invention, showing the stabilizing circuitry.

Referring now to the drawings, and in particular to FIG. 3, the circuit of a preferred embodiment of the invention is shown. The input signals to be compared are applied to the bases, labeled "B," of input transistors 11 and 12. These transistors are connected in parallel, having their emitters, labeled "E" connected together and their collectors, labeled "C" also connected together. Transistor 13, normally called a reference transistor, has its emitter coupled to the common emitters of transistors 11 and 12. Resistors 14 and 15 help maintain the proper bias voltages on transistors 11 and 12, and 13, respectively. These resistors are connected to a bias supply voltage labeled "$V_{CC}$," which, in the case of emitter-coupled logic circuitry, is normally ground, as shown.

Proper current supply is obtained by the use of transistor 16 connected in series with resistor 17, which together form a current source means 18. Current source means 18 is coupled to bias supply terminal 19 labeled "$-V_{EE}$." In emitter coupled logic circuitry, the voltage at terminal 19 is normally lower than the voltage at terminal 20, hence the minus sign before $V_{EE}$.

Output signals are obtained from a pair of output means 21 and 22, which are coupled to the common collectors of the input transistors 11 and 12 and the collector of reference transistor 13, respectively. Output means 21 and 22 include output transistors 23 and 24, respectively. The bases of these transistors are coupled to the input and reference transistors, as shown, and the collectors are coupled to the bias supply terminal 20. The output signals are obtained at terminals 25 and 26 at the respective emitters of output transistors 23 and 24.

When at least one of the input signals to input transistors 11 and 12 is high, the transistor having the high input signal (or both transistors if both input signals are high) turn on, causing current to flow through their base-emitter circuits. This current flow raises the emitter voltage on reference transistor 13 thereby turning transistor 13 off. With reference transistor 13 off, the emitter of transistor 24 connected to output terminal 26 is high. This output terminal is called the OR output. A high voltage level on terminal 26 indicates, therefore, that one or the other or both inputs to transistors 11 and 12 must have been high, signifying the OR condition. Conversely, with transistor 13 off, the emitter of output transistor 23, and thus output terminal 25, are both low. This low output is therefore termed the NOR output which means NOT OR. A low output voltage at the NOR terminal 25 signifies that the inputs were NOT NOR; the inputs must therefore have been OR, indicating that one or both input signals to input transistors 11 and 12 was high.

In the event that both input signals at the bases of input transistors 11 and 12 are low, signifying the NOR condition, transistors 11 and 12 are both off. Then reference transistor 13 is necessarily on. Under those conditions, terminal 26 is low because of the conduction of current through resistor 15 by reference transistor 13, and terminal 25 is high because of the nonconduction of both input transistors 11 and 12. The high signal at output terminal 25 indicates the NOR condition, and the low voltage level at output terminal 26 indicates the lack of the OR condition, or the NOT OR condition.

An important feature of this invention is the stabilizing circuit 27. This circuit comprises a resistor 28 in series with a pair of parallel back-to-back PN junctions, specifically shown as diodes 29 and 30. Obviously, these diodes can, in an integrated circuit, take the form of an emitter-base junction or a collector-base junction of a double diffused transistor, preferably the former. Any oppositely oriented PN junctions will serve the purpose of diodes 29 and 30. Stabilizing circuit 27 couples the output circuits 21 and 22, as shown in FIG. 3. The purpose of the stabilizing means is to maintain the voltage value of the two output levels from each of the two output circuits 21 and 22 substantially constant over reasonable changes in ambient temperature. This stabilization occurs, in the circuit of the invention, whether output terminal 25 is high and output terminal 26 is low, or vice versa. The essence of the stabilizing circuit is to make sure that if one of the output transistors, such as transistor 24, is temperature independent, that the other output transistor, namely output transistor 23, is correspondingly temperature independent.

The fact that this occurs in the circuit of the invention can be shown mathematically. Let us assume that the voltage at terminal 26 at the emitter of output transistor 24 is temperature independent. Call this voltage $-V_{L26}$ where the subscript "L26" means low voltage on terminal 26 and the minus sign denotes that it is negative. The subscript "H" followed by a number, will conversely denote a high voltage on the corresponding numbered terminal. Then the voltage at the base of transistor 24 is $-(V_{L26}-\Phi_e)$, wherein $\Phi_e$ is the normal voltage drop across any silicon PN junction, in particular, the emitter-base junction of transistor 24. Because $V_{cc}$ is ground, $-(V_{L26}-\Phi_e)$ is therefore the voltage at terminal 31 at one end of the stabilizing circuit 27. The voltage at terminal 32 on the other side of the back-to-back diodes is therefore $-(V_{L26}-2\Phi_e)$, since there is an additional PN junction voltage drop across one of the diodes 29 and 30. The other diode has no current flow because it is reverse biased by $\Phi_e$, the emitter-base forward drop of the first PN junction.

If the value of resistor 28 is approximately the same as the value of resistor 14, these two resistors, at their common node, split in half the voltage at node 32. Therefore the voltage at the base of output transistor 23 is $-(V_{L26}-\Phi_e)/2$. The emitter voltage of transistor 23 (i.e. the voltage on output terminal 25) is the same as transistor 23's base voltage less its base-emitter voltage drop $\Phi_e$. Thus the emitter voltage $V_{H25}$ of transistor 23 is just $(-V_{L26}/2)$. This demonstrates that the voltage at the emitter of output transistor 23 is directly proportional (by a factor of one-half when resistors 14 and 28 are substantially equal) to the emitter voltage of output transistor 24 when both input signals to input transistors 11 and 12 are low. When one or both inputs to transistors 11 and 12 are high, the same analysis applies except now $V_{H26}=-V_{L25}/2$.

Three resistors, 33, 34 and 35, are used to set up the proper reference voltages for reference transistor 13 and switching transistor 16 (within current source 18). Preferably resistors 33 and 35 have approximately the same value and resistor 34 has approximately twice that value.

Figure 4:
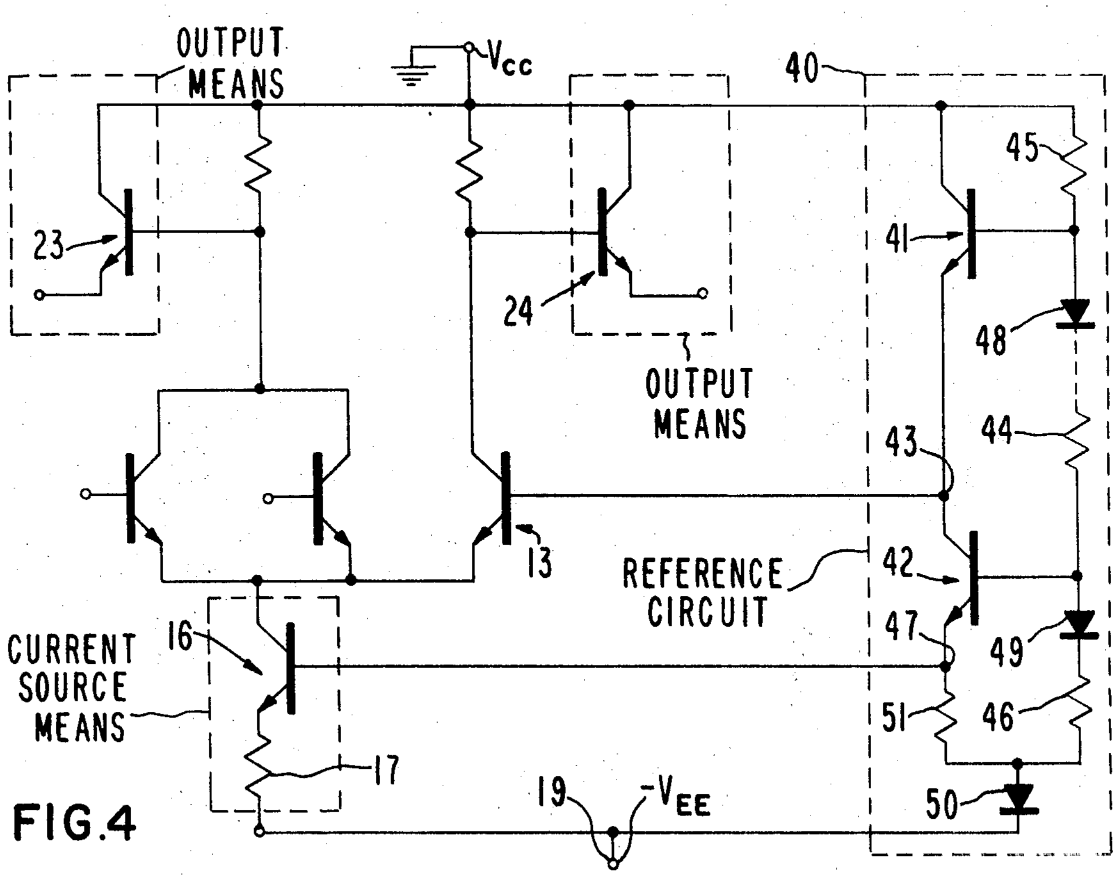
FIG. 4 is the circuit of another embodiment of the invention, particularly showing the stable voltage reference source.

Referring to FIG. 4, a conventional emitter-coupled logic circuit is shown having a low impedance bias driver circuit 40. The purpose of this circuit is to supply a constant reference voltage at terminal 43 irrespective of temperature, at a low impedance level. In the circuit as shown in FIG. 4, the reference voltage at terminal 43 is $V_{EE}/4$ beneath $V_{cc}$.

The purpose of the reference network, including transistors 41 and 42 and diodes 48, 49 and 50, is to create the proper voltage drops across resistors 44, 45, 46 and 51 and the proper currents through these resistors.

This reference circuit works as follows. The voltage on the base of transistor 41 is just $[-R45/(R45+R44+R46)]\times(V_{EE}-n\Phi_e)$ where $\Phi_e$ is just the junction voltage across a forward biased PN junction and $n$ is the number of diodes in series between ground and $-V_{EE}$. Thus the voltage $V_{B13}$ at node 43 and on the base of transistor 13, is just $$V_{B13}=[-R45/(R45+R44+R46)]\times(V_{EE}-n\Phi_e)-\Phi_e$$
$$=-\alpha V_{EE}+(n-1)\Phi_e \qquad (1)$$

where $$\alpha=R45/(R45+R44+R46).$$

For $V_{B13}$ to be temperature stable, the coefficient of $\Phi_e$ in Equation (1) must be zero, thereby canceling the effect of temperature on the PN junctions in the reference circuit. Therefore $$\alpha n=1 \qquad (2)$$

Since $\alpha$ is determined by the resistors selected for the reference circuit, Equation (2) can be solved for $n$ giving $$n=1/\alpha \qquad (3)$$

Therefore, $n$, the number of diodes, is directly equal to the ratio of the sum of the values of resistors 44, 45 and 46 to the value of resistor 45. Since $n$ must be an integer, for $V_{B13}$ to be independent of temperature, this ratio must be an integer.

Alternatively stated, the sum of the values of resistors 46 and 44 is proportional to the value of resistor 45, the proportionality constant being $(n-1)$ wherein $n$ is equal to the number of series-connected diodes 48. Therefore, although diode 48 may be a single diode, the use of dashed lines beneath diode 48 indicates that more than one diode may be used. Preferably, two diodes are used.

Extension of the above analysis shows that the base voltage on transistor 16 (i.e. the emitter voltage of transistor 42) is also independent of temperature.

Diode 50, which temperature compensates the base-emitter junction of transistor 16, has one terminal coupled to the power supply terminal 19. Resistor 46 couples the other terminal of diode 50 to one terminal of diode 49. Resistor 51 couples that same terminal of diode 50 to the emitter of transistor 42. In a preferred embodiment of the invention, resistor 44 has twice the value of resistors 45 and 46. Resistor 44 can, however, also have other values, and, if desired, can even be zero. However, regardless of the values of resistors 44, 45 and 46, $1/\alpha$ must be an integer.

Figure 5:
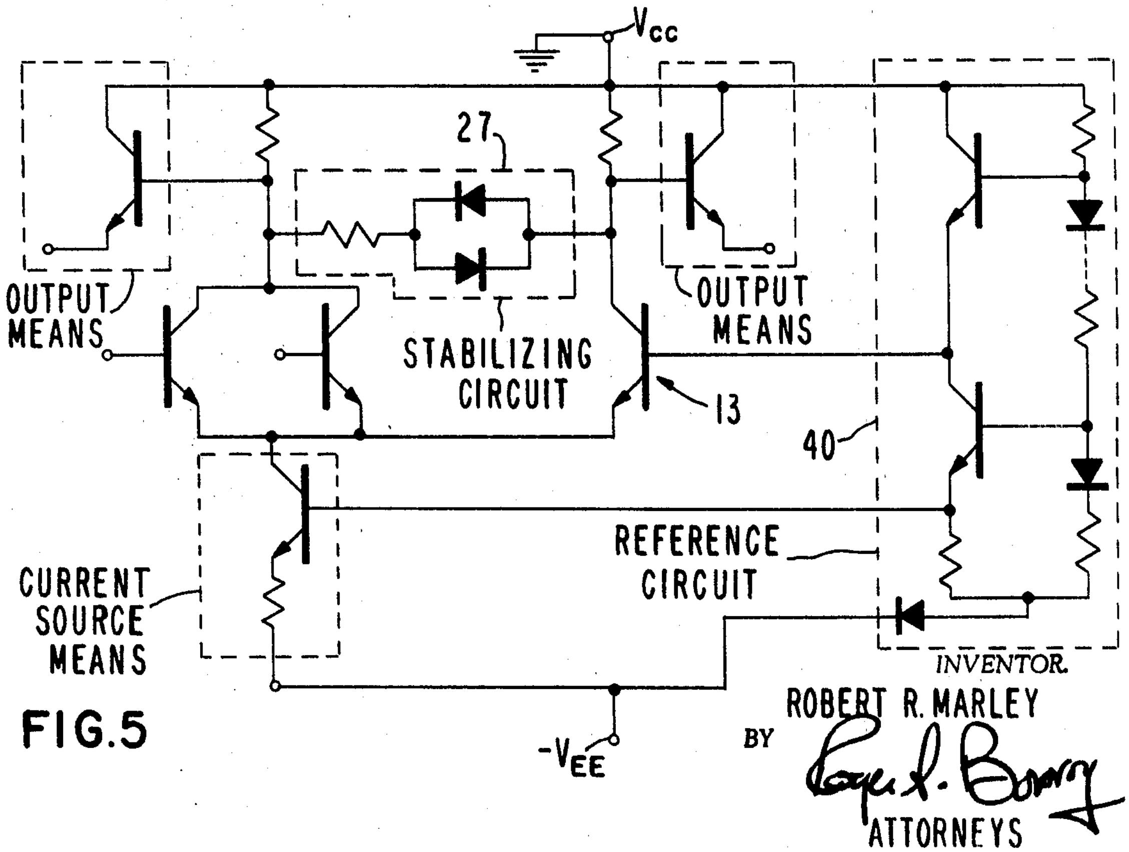
FIG. 5 is a preferred embodiment of the invention having both the stabilizing circuitry and the stable voltage reference source.

The reference network 40 may also be used in circuitry other than the emitter-coupled logic circuitry illustrated in FIG. 4. For example, this network can be used as a constant voltage power supply with a low output impedance for other types of logic circuits, or for a conventional amplifier, preferably an integrated circuit amplifier. In addition, as shown in FIG. 5, the reference network may be employed with the emitter coupled logic circuitry of the preferred embodiment of the invention having a stabilizing circuit means 27. The operation and details of the reference circuit 40, as shown in FIG. 5, are exactly as was described above in connection with FIG. 4. The combined circuit of FIG. 5 therefore has two essential advantages: stable temperature-independent output levels, as discussed hereinabove, and a very stable source of reference voltage at the base of transistor 13. The resulting circuit has a low output impedance and temperature-independent voltage levels.

Although not limiting of the general description above, below are representative values of the devices used in a specific example:

Circuit of Figure 3

| Reference No. | | Value |
|---|---|---|
| Resistors 14, 15, and 28 | ohms | 120 |
| Resistor 17 | ohms | 60 |
| Resistors 33 and 35 | ohms | 650 |
| Resistor 34 | ohms | 1, 300 |
| $-V_{EE}$ | volts | 5. 2 |
| $V_{CC}$ | volt | 0 |

Circuit of Figure 4

| | | |
|---|---|---|
| Resistor 45 | ohms | 170 |
| Resistor 44 | ohm | 0 |
| Resistor 46 | ohms | 510 |
| Resistor 51 | ohms | 510 |
| Resistor 17 | ohms | 170 |

All transistors and diodes are made conventionally in an integrated circuit process. It is important that the devices be designed so that the current density through diodes 29, 30, 48, 49 and 50, and transistors 16, 23, 24, 41 and 42, is approximately the same. This yields approximately equal $\Phi_e$'s on all the junctions of these devices,. Moreover, the change in $\Phi_e$ with temperature on each of these devices is also the same. This design can be accomplished readily by the skilled integrated circuit designer and processor.

What I claim is:

1. A logic circuit for providing both high and low output logic levels which are substantially temperature independent, comprising:

a pair of parallel-connected input transistors having coupled emitters and coupled collectors;

biasing means for connecting a power supply across the collectors and emitters of said input transistors;

a pair of output circuits which each receive signals from the collectors of said input transistors and derive output signals therefrom, one output signal being of one level while the other is of a different level, the difference between said levels being readily detectable; and a stabilizing circuit means coupled between said pair of output circuit means, said stabilizing circuit means including a resistor in series with a pair of parallel oppositely-poled PN junctions, said stabilizing circuit means maintaining the two different output levels from each of said output circuit means substantially constant over a range of changes in ambient temperature.

2. The circuit of claim 1 further characterized by a third transistor having its emitter coupled to the emitters of said pair of input transistors, the collectors of said input transistors forming a node, said third transistor and said input transistors together forming a current switch, said stabilizing circuit means being coupled between said node and the collector of the said third transistor.

3. The circuit of claim 2 further characterized by a current source series-coupling the said coupled emitters of said input transistors and one power supply terminal.

4. The circuit of claim 3 further characterized by said current source including a fourth transistor in series between said coupled emitters of said input transistors and said one power supply terminal.

5. The logic circuit of claim characterized further characterized by said biasing means adapted to divide the power supply voltage proportionally, the portion between the other power supply terminal and the base of said third transistor being approximately equal to the voltage between the base of said fourth transistor and the one power supply terminal and being approximately equal to one-half the portion between the respective bases of said third and fourth transistor.

6. The circuit of claim 5 further characterized by said voltage division being accomplished by three series-coupled resistors having two nodes therebetween coupling the said one power supply terminal in said circuit to the other power supply terminal.

7. The circuit of claim 6 further characterized by one of said resistor nodes being coupled to the base of said fourth transistor and the other of said resistor nodes being coupled to the base of said third transistor.

8. The circuit of claim 6 further characterized by the value of the center resistor being approximately equal to twice the value of the other two resistors.

9. The logic circuit of claim 4 further characterized by:

a fifth transistor having its emitter-collector circuit coupled between the other power supply terminal and the base of said third transistor;

a sixth transistor having its emitter-collector circuit coupled between the respective bases of said third and fourth transistors;

a first resistor coupling the base of said fifth transistor to said other power supply terminal;

one or more series-connected diodes coupling the respective bases of said fifth sand sixth transistors;

second and third diodes and a second resistor all connected in series between said one power supply terminal and the base of said sixth transistor; and a third resistor coupling the emitter of said sixth transistor to said one power supply terminal.

10. The logic circuit of claim 9 further characterized by a fourth resistor in series with said one or more series-connected diodes coupling the bases of said fifth and sixth transistor, the number of said series-connected diodes being greater than one.

11. The logic circuit of claim 10 further characterized by the value of the sum of the resistances of said second and fourth resistors being proportional to the value of the resistance of said first resistor, the proportionality constant being $(n-1)$, wherein $n$ is equal to the number of said series-connected diodes.

12. The logic circuit of claim 11 further characterized by said third diode having one terminal coupled to said one power supply terminal and by said second resistor series-coupling said second and third diodes, said third resistor series-coupling the emitter of said sixth transistor to the other terminal of said third diode.

13. The logic circuit of claim 11 with "$n$" being equal to 2.

14. The circuit of claim 1 further characterized by said biasing means including a resistor coupled between the collector of one of said pair of input transistors and the other terminal of said power supply.

15. The circuit of claim 14 further characterized by said resistor having substantially the same value as the resistor in series with said pair of parallel PN junctions.

16. The circuit of claim 15 further characterized by a third transistor having its emitter coupled to the emitters of said pair of input transistors, the collectors of said input transistors forming a node, said third transistor and said input transistors together forming a current switch, said stabilizing circuit means being coupled between said node and the collector of the said third transistor, and said pair of output circuit means including seventh and eighth transistors, the collectors of which are coupled to said other terminal of said power supply, the bases of which are coupled, respectively, to one or the other of the collector of said third transistor or said collector node of said input transistors, the desired output signals thereby appearing at the respective emitters of said seventh and eighth transistors.

17. In a logic circuit having:

a pair of parallel-connected input transistors having coupled emitters and coupled collectors;

a pair of output circuits for deriving two output signals from the collectors of said input transistors, one output signal being of one level while the other is of a different level, the difference between said levels being readily detectable, one of said pair of output circuits being connected to the coupled collectors of said pair of parallel-connected input transistors;

a third transistor having its emitter coupled to the emitters of said pair of input transistors and its collector coupled to the other of said pair of output circuits, said third transistor and said input transistors together forming a current switch; and a current source series-coupling the said coupled emitters of said input transistors to one power supply terminal, said current source including a fourth transistor having its emitter-collector circuit coupled between said coupled emitters of said input transistors and said one power supply terminal;

a stable reference source, comprising:

a. a fifth transistor having its emitter-collector circuit coupled between the other power supply terminal and the base of said third transistor;

b. a sixth transistor having its emitter-collector circuit coupled between the respective bases of said third and fourth transistors;

c. a first resistor coupling the base of said fifth transistor to said other power supply terminal;

d. one or more series-connected diodes coupling the respective bases of said fifth and sixth transistors;

e. second and third diodes and a second resistor all connected in series between said one power supply terminal and the base of said sixth transistor; and a third resistor coupling the emitter of said sixth transistor to said one power supply terminal.

18. The logic circuit of claim 17 further characterized by a fourth resistor in series with said one or more series-connected diodes coupling the bases of said fifth and sixth transistor, the number of said series-connected diodes being greater than one.

19. The logic circuit of claim 18 further characterized by the value of the sum of the resistances of said second and fourth resistors being proportional to the value of the resistance said first resistor, the proportionality constant being $(n-1$, wherein $n$ is equal to the number of said series-connected diodes.

20. The logic circuit of claim 17 further characterized by said third diode having one terminal coupled to said one power supply terminal and by said second resistor series-coupling said second and third diodes, said third resistor series-coupling the emitter of said sixth transistor to the other terminal of said third diode.